United States Patent
Jagaric et al.

(10) Patent No.: US 7,044,829 B1
(45) Date of Patent: May 16, 2006

(54) PAD WITH RIGID AND STRETCHABLE FOAM

(75) Inventors: Andrea Jagaric, New York, NY (US); Judith Grigor, New York, NY (US)

(73) Assignee: Victoria's Secret Stores Brand Management, Inc., Reynoldsburg, OH (US)

( * ) Notice: Subject to any disclaimer, the term of this patent is extended or adjusted under 35 U.S.C. 154(b) by 0 days.

(21) Appl. No.: 11/060,254

(22) Filed: Feb. 17, 2005

(51) Int. Cl.
*A41C 3/00* (2006.01)

(52) U.S. Cl. .............................. 450/54; 450/39; 2/267

(58) Field of Classification Search .................. 450/37, 450/38, 39, 54–57, 92, 93; 2/455, 463, 267, 2/268, 92; 623/7, 8; 156/245; 264/257, 264/258, 291, 292, 294, 145, 148, 152–157, 264/160, 163, 554
See application file for complete search history.

(56) References Cited

U.S. PATENT DOCUMENTS

| | | | |
|---|---|---|---|
| 2,563,241 A | 8/1951 | Herbener | |
| 2,673,981 A | 4/1954 | Popp | |
| 2,725,574 A | 12/1955 | Block et al. | |
| 2,834,352 A | 5/1958 | Ullian | |
| 2,891,544 A | 6/1959 | London | |
| 3,164,655 A | 1/1965 | Howard et al. | |
| 3,186,271 A | 6/1965 | Kaiser | |
| 3,266,495 A | 8/1966 | Sachs | |
| 3,311,007 A | 3/1967 | McGee | |
| 3,356,090 A | 12/1967 | Plantinga et al. | |
| 3,417,755 A | 12/1968 | Howard et al | |
| 3,502,083 A | 3/1970 | Howard et al. | |
| 3,799,174 A | 3/1974 | Howard | |
| 3,807,412 A * | 4/1974 | Connelly | 450/57 |
| 3,878,568 A * | 4/1975 | Connelly | 623/7 |
| 4,025,597 A | 5/1977 | Sawamoto | |
| 4,080,416 A | 3/1978 | Howard | |
| 4,244,249 A | 1/1981 | DiTullio | |
| 5,098,330 A | 3/1992 | Greenberg | |
| 5,967,877 A | 10/1999 | Howard | |
| 6,042,608 A | 3/2000 | Ishikawa et al. | |
| 6,083,080 A * | 7/2000 | Lawson et al. | 450/39 |
| 6,213,841 B1 | 4/2001 | Kuo | |
| 6,231,423 B1 | 5/2001 | Deal et al. | |
| 6,805,610 B1 | 10/2004 | Luk | |
| 6,805,612 B1 | 10/2004 | Luk | |
| 6,811,464 B1 | 11/2004 | Li | |

\* cited by examiner

*Primary Examiner*—Gloria M. Hale
(74) *Attorney, Agent, or Firm*—Colucci & Umans; Angelo Notaro; Peter C. Michalos

(57) ABSTRACT

A method is provided for making a bra pad having a rigid foam that is thickest at the bottom of the pad for hidden support and a stretchable softer foam for comfort and universal fit throughout the entire pad. The method includes pre-laminating rigid and stretchable foam sheets with fabric and shaving the foam sheets. The rigid foam sheet is shaved so that it has a V-shaped recess and a gradually sloped interface between the V-shaped recess and remainder of the sheet. The stretchable foam sheet is shaved so that it has a pair of elevated areas. Then, the top surfaces of the shaved foam sheets are affixed together to form a pre-form assembly and the pre-form assembly is molded under heat. The pair of pads are then trimmed out.

12 Claims, 13 Drawing Sheets

FIG. 10
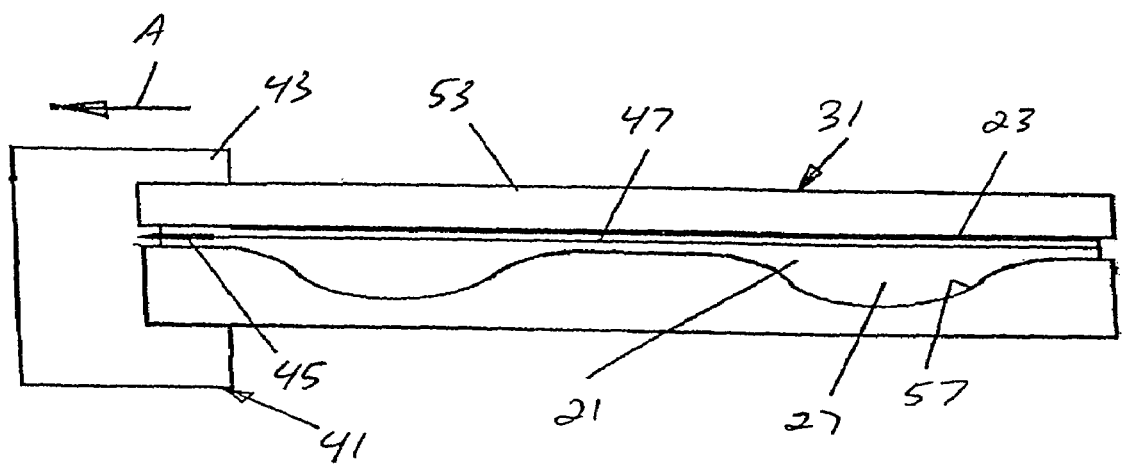
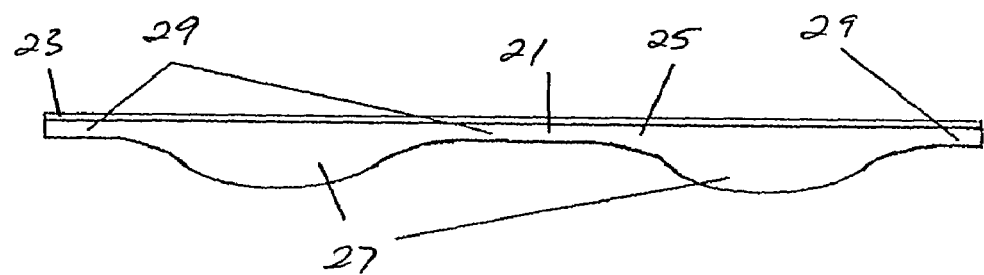
FIG. 11

PAD WITH RIGID AND STRETCHABLE FOAM

FIELD AND BACKGROUND OF THE INVENTION

The present invention relates generally to the field of bras and related garments and in particular to a new and useful pad product having a combination of rigid and stretch foam and varying thickness for use in bras, camisoles, slips or any other breast covering garment where padding is desired.

Pads typically contain at least one layer of cushioning material such as foam or fiberfill. Some pads also have more than one layer of cushioning material, such as those described in Published U.S. Patent Application 2003/0181129 A1, U.S. Pat. No. 6,811,464, U.S. Pat. No. 6,805,610, and U.S. Pat. No. 2,673,981.

U.S. Pat. No. 5,967,877 combines a foam pad with a support rib along the lower edge portion of the pad. The rib is described as a thin strip of polyurethane foam or other foam-like material.

In addition, U.S. Pat. No. 2,563,241 and U.S. Pat. No. 2,834,352 to Ullian describe bra pads having varying thicknesses.

Still, there is a need for a pad that can provide hidden support without the need for visible ribs or other uncomfortable support devices. Furthermore there is a need for balancing comfort and support at pre-determined locations while maintaining a universal fit. Finally, there is a need for a method for making such a pad.

SUMMARY OF THE INVENTION

It is an object of the present invention to provide a method of manufacturing a bra pad which balances both comfort and hidden support at vital pre-determined areas while maintaining a universal fit.

It is a further object of the invention to provide a bra pad made in accordance with the method of the invention.

Accordingly, a method is provided for making a bra pad having a rigid foam that is thickest at the bottom of the pad for support and a stretchable softer foam for comfort and universal fit throughout the entire pad. The contour of the pad has variations in thickness for balancing comfort and support in pre-determined areas.

The method includes the steps of pre-laminating rigid and stretchable foam sheets, shaving the sheets, affixing the top surfaces of the shaved foam sheets together to form a pre-form assembly, molding the pre-form assembly under heat, and trimming the final pad into the shape of a cup. The rigid sheet is shaved so that it has a V-shaped recess and a gradually sloped interface between the V-shaped recess and remainder of the sheet. The stretchable sheet is shaved so that it has a pair of elevated areas.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 10 is a schematic diagram of the operation of the shaving apparatus with the mold assembly for shaving the pre-laminated stretchable foam assembly;

FIG. 11 is a side view of the shaved stretchable foam assembly of FIG. 7;

DESCRIPTION OF THE PREFERRED EMBODIMENTS

Figure 1:
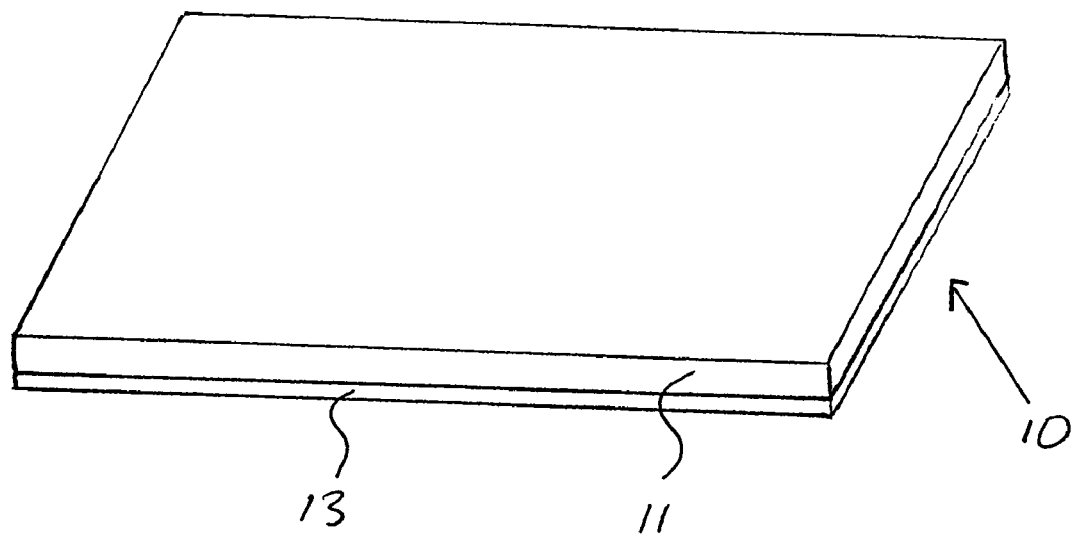
FIG. 1 is a perspective top and front view of a pre-laminated rigid foam assembly.

Referring now to the drawings, in which like reference numerals are used to refer to the same or similar elements, FIG. 1 shows an assembly generally designated 10 formed in the first step of the present invention by laminating a sheet of fabric 13 to the bottom surface of a rigid sheet of foam 11. Laminating is accomplished by conventional means such as gluing. The sheet of foam 11 and the sheet of fabric 13 are co-extensive. The rigid sheet of foam 11 is preferably polyurethane foam having a density between 45 and 55 kg/m$^3$ and a hardness between 43–57 N. Although polyurethane foam is preferred, any thermoplastic foam material can be used according to the present invention, and in fact any formable material can be used which is capable of being formed into a permanent yet resilient three-dimensional shape, having a density and hardness in the range described above.

Figure 2:
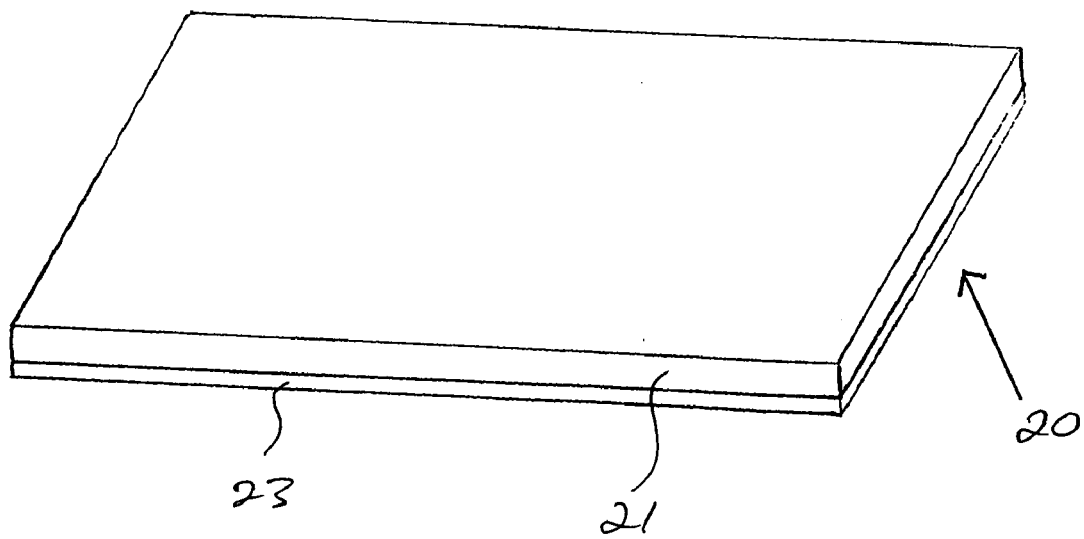
FIG. 2 is a perspective top and front view of a pre-laminated stretchable foam assembly.

FIG. 2 shows an assembly generally designated 20 in which a stretchable sheet of foam 21 is laminated with a sheet of fabric 23 on its bottom surface. The sheet of foam 21 and the sheet of fabric 23 are co-extensive. The stretchable sheet of foam 21 is preferably polyurethane foam having a density between 39 and 47 kg/m$^3$ and a hardness between 80 and 95 N. Although polyurethane foam is preferred, any thermoplastic foam material can be used according to the present invention, and in fact any formable material can be used which is capable of being formed into a permanent yet resilient three-dimensional shape, having a density and hardness in the range described above.

Figure 3:
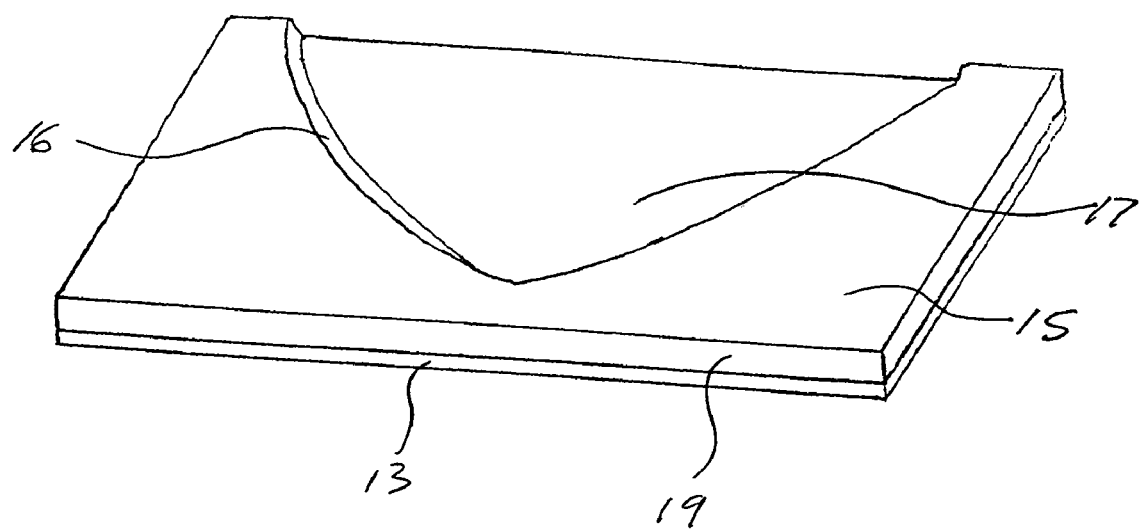
FIG. 3 is a perspective top and front view of a shaved pre-laminated rigid foam assembly with a V-shaped recess on the top surface.

In the next step, the rigid sheet of foam 11 is shaved to produce a sheet of shaved foam 15 having a "V" shaped recess 17 as shown in FIG. 3. An interface region 16 gradually slopes upward from the V-shaped recess 17 to the remainder of the shaved foam 15 surface. The sheet of shaved foam 15 is formed by the following process.

Figure 4A:
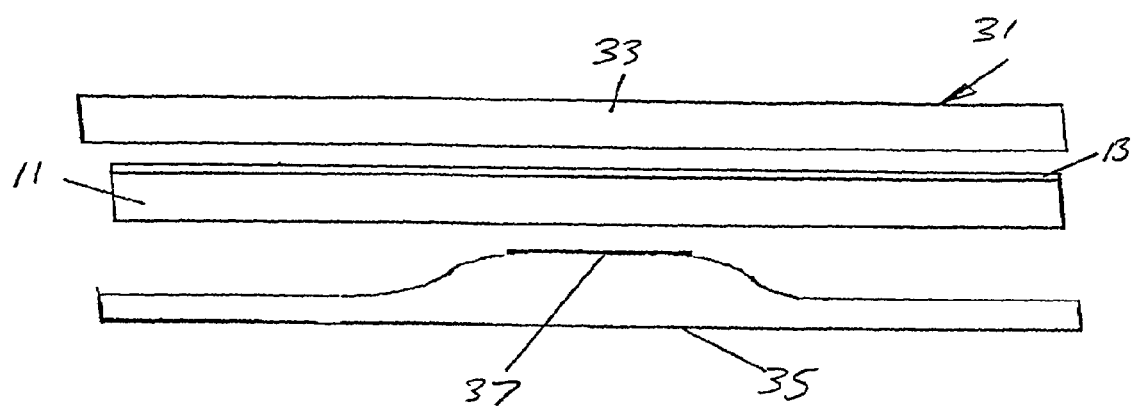
FIG. 4A is a schematic diagram of the mold assembly for shaving the pre-laminated rigid foam assembly.
Figure 4B:
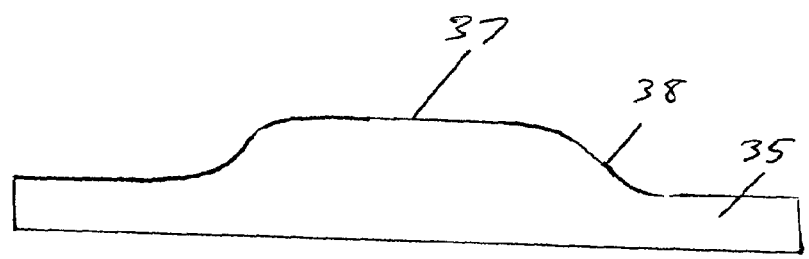
FIG. 4B is a side view of the lower mold portion of the mold assembly.
Figure 4C:
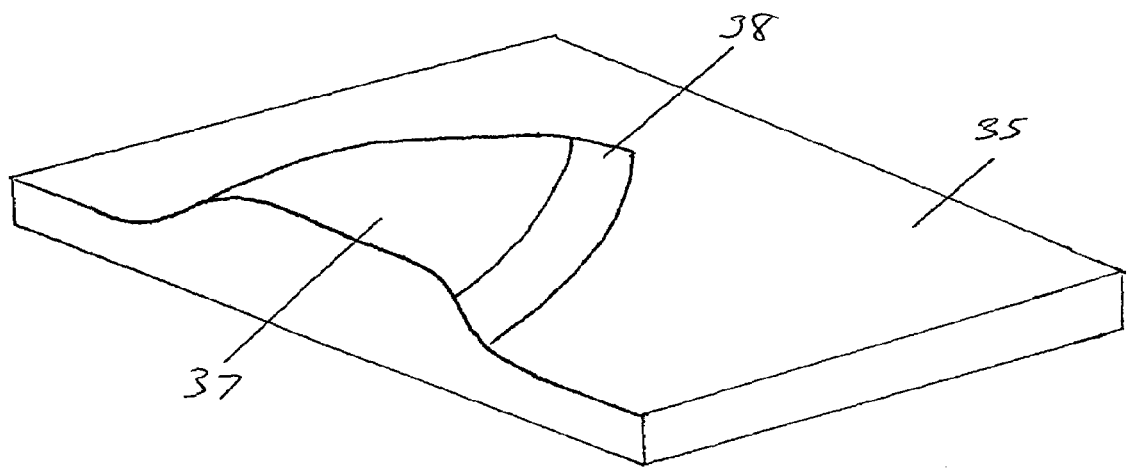
FIG. 4C is a top perspective view of the lower mold portion of the mold assembly.

FIG. 4A shows a shaving mold generally designated 31 comprising an upper shaving mold portion 33 and a lower shaving mold portion 35 with a thickness of e.g. 12 mm rigid polyurethane foam 11 therebetween. The shaving mold halves or portions 33 and 35 can be made of wood, plastic, metal or other suitable rigid material. As illustrated in FIGS. 4B–4C, lower mold half 35 contains an extended or raised member 37 on its upper surface which gradually rises at a region 38.

Figure 5:
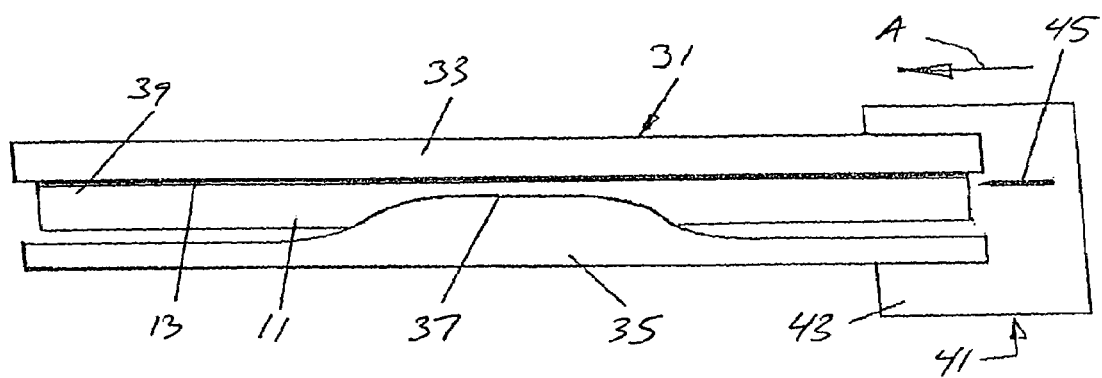
FIG. 5 is a schematic diagram of the mold assembly and shaving apparatus for shaving the pre-laminated rigid foam assembly.

FIG. 5 illustrates the shaving mold in its closed position with the resilient formable sheet of material 11 pressed down onto the lower mold half so that some of the material of sheet 11 is pressed against the raised member 37 and is therefore indented with the raised member 37 in the center. A thickness of material, for example at 39, remains above the raised member 37 of the lower shaving mold half 35.

A shaving apparatus generally designated 41 is also illustrated in FIG. 5 which comprises a movable carriage 43, which carries a blade, knife or shaving member 45 that extends transversely the full width of material sheet 11 (perpendicular to the plane of FIG. 5). Blade 45 is also positioned intermediate to the upper and lower shaving mold halves 33, 35 respectively so that a portion of the layer 39 can be neatly shaved from the sheet 11. For this purpose, member 45 may be heated (e.g., a cutting wire), may be mounted for movement like a band saw, may be reciprocally vibrated back and forth like an electric knife or oscillated in any other appropriate way for cutting the foam material of sheet 11.

Figure 6:
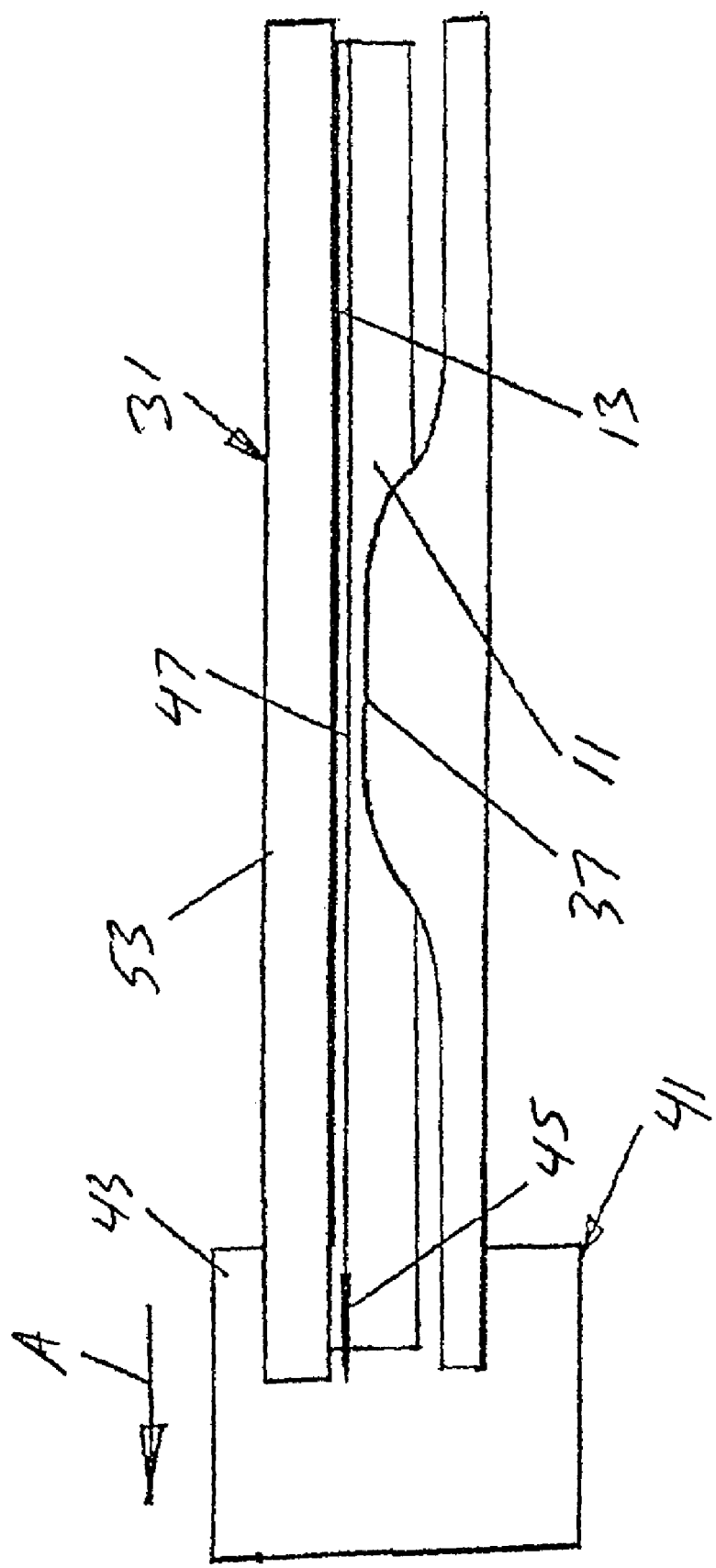
FIG. 6 is a schematic diagram of the operation of the shaving apparatus with the mold assembly for shaving the pre-laminated rigid foam assembly.

With the shaving apparatus 41 activated to vibrate, heat or otherwise activate member 45, the carriage 43 is moved in the direction of arrow A and across the sheet 11 until it reaches its final position shown in FIG. 6. In this position a slice 47 has been made in sheet 11 thus achieving the shaving effect. FIG. 3 shows the shaved component 15 which is removed from the shaving mold after it is opened and which contains a V-shaped recess 17 surrounded by thicker material area 19, and an area of graduated thickness 16 between the recess 17 and remaining thicker area 19 of the shaved component.

Figure 7:
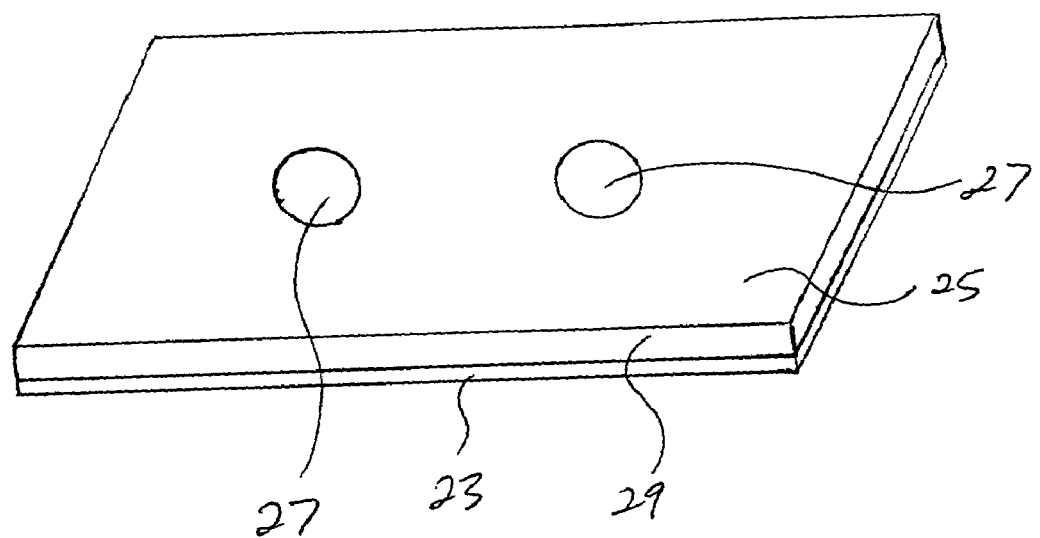
FIG. 7 is a perspective top and front view of a shaved pre-laminated stretchable foam assembly with a pair of elevated areas on the top surface schematically designated by two circles.

In the next step, the stretchable sheet of foam 21 is shaved to produce a sheet of shaved foam 25 having a pair of elevated areas 27 as schematically shown in FIG. 7 by two circles. The shaved sheet of foam 25 is formed by the following process.

Figure 8:
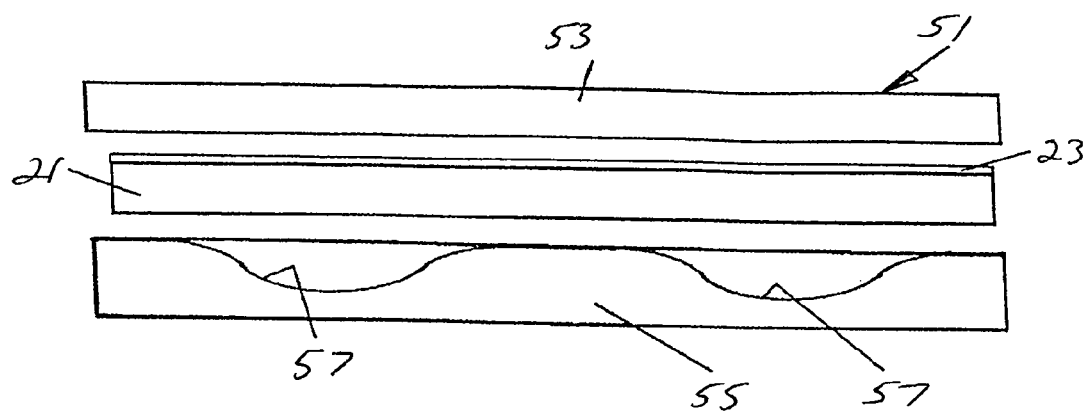
FIG. 8 is a schematic diagram of the mold assembly for shaving the pre-laminated stretchable foam assembly.

FIG. 8 shows a shaving mold generally designated 51 comprising an upper shaving mold portion 53 and a lower shaving mold portion 55 with a thickness of e.g. 9 mm stretchable polyurethane foam 21 therebetween. The shaving mold halves or portions 53 and 55 can be made of wood, plastic, metal or other suitable rigid material. Lower mold half 55 contains a pair of recesses 57 in its upper surface.

Figure 9:
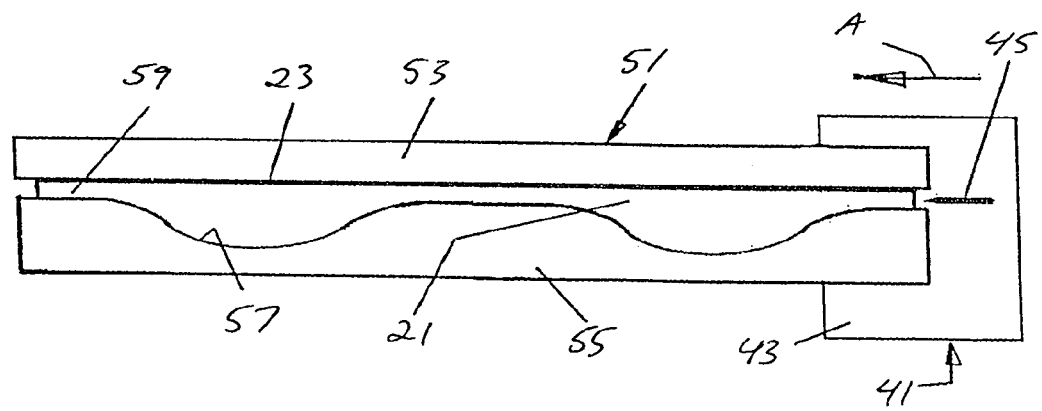
FIG. 9 is a schematic diagram of the mold assembly and shaving apparatus for shaving the pre-laminated stretchable foam assembly.

FIG. 9 illustrates the shaving mold in its closed position with the resilient formable sheet of material 21 pressed down onto the lower mold half so that some of the material of sheet 21 is pressed into each recess 57 but also a thickness of material, for example at 59, remains above the recesses 57 of the lower shaving mold half 55.

A shaving apparatus generally designated 41, as also described above in FIGS. 5–6, is illustrated in FIG. 9. The shaving apparatus 41 comprises a movable carriage 43, which carries a blade, knife or shaving member 45 that extends transversely the full width of material sheet 21 (perpendicular to the plane of FIG. 9). Blade 45 is also positioned intermediate to the upper and lower shaving mold halves 53, 55 respectively so that a portion of the layer 59 can be neatly shaved from the sheet 21. For this purpose, member 45 may be heated (e.g., a cutting wire), may be mounted for movement like a band saw, may be reciprocally vibrated back and forth like an electric knife or oscillated in any other appropriate way for cutting the foam material of sheet 21.

With the shaving apparatus 41 activated to vibrate, heat or otherwise activate member 45, the carriage 43 is moved in the direction of arrow A and across the sheet 21 until it reaches its final position shown in FIG. 10. In this position a slice 47 has been made in sheet 21 thus achieving the shaving effect. FIGS. 7 and 11 show the shaved component 25 which is removed from the shaving mold after it is opened and which contains a pair of elevated areas 27 of thicker material, surrounded by thinner material areas 29.

Although sheets of foam 11 and 21 were pre-laminated in a previous step with respective fabrics 13 and 23, the lamination may optionally be done following the shaving of the sheets, wherein the fabric would be laminated to the bottom of the rigid or stretchable shaved foam sheet while the top of the rigid or stretchable shaved foam sheet has a recess or a pair of elevated areas respectively.

Figure 12:
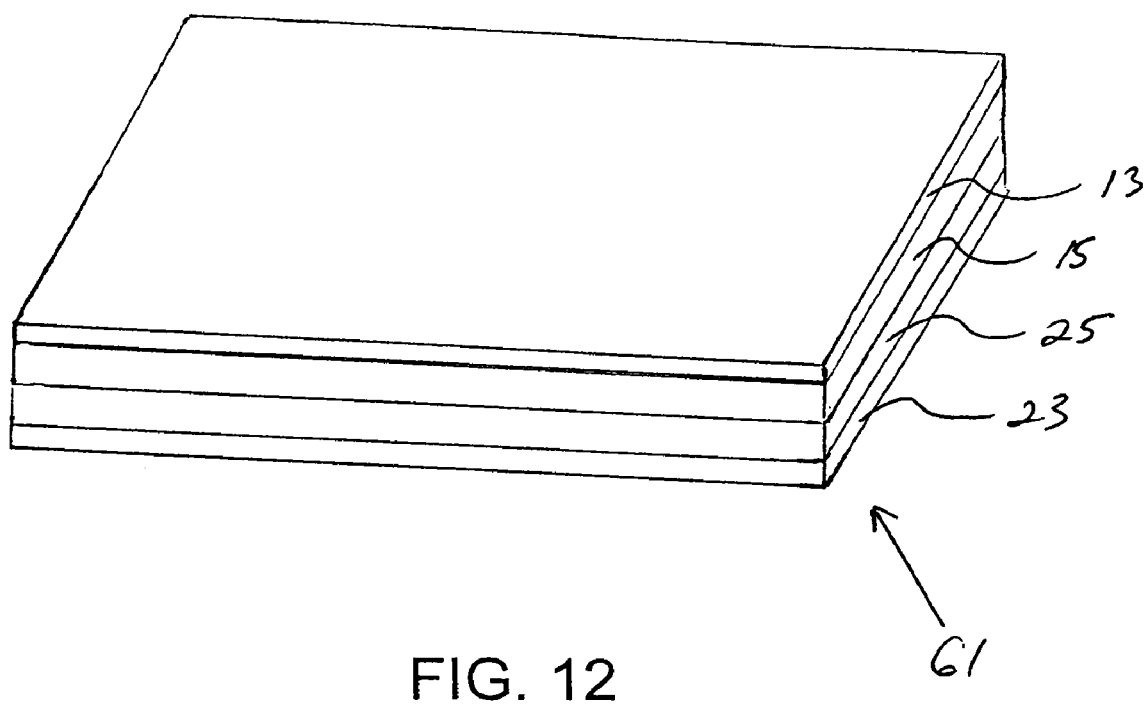
FIG. 12 is a top and front perspective view of the pre-form assembly.

Then the top surface of the shaved sheet of foam 15 is affixed to the top surface of the shaved sheet of foam 25 via conventional means such as glue producing a pre-form assembly generally designated 61. The laminated fabrics 13 and 23 of the respective foam sheets remain on the outside of the assembly 61 while the shaved foams 15 and 25 are sandwiched therebetween as shown in FIG. 12. The V-shaped recess on the top of the rigid shaved foam sheet 15 faces the pair of elevated areas on the top of the stretchable shaved foam sheet 25. Shaved foam sheet 15 will form the outer or front portion of the pad away from the user and the shaved foam sheet 25 will form the inner or rear portion of the pad closest to the user.

Figure 13:
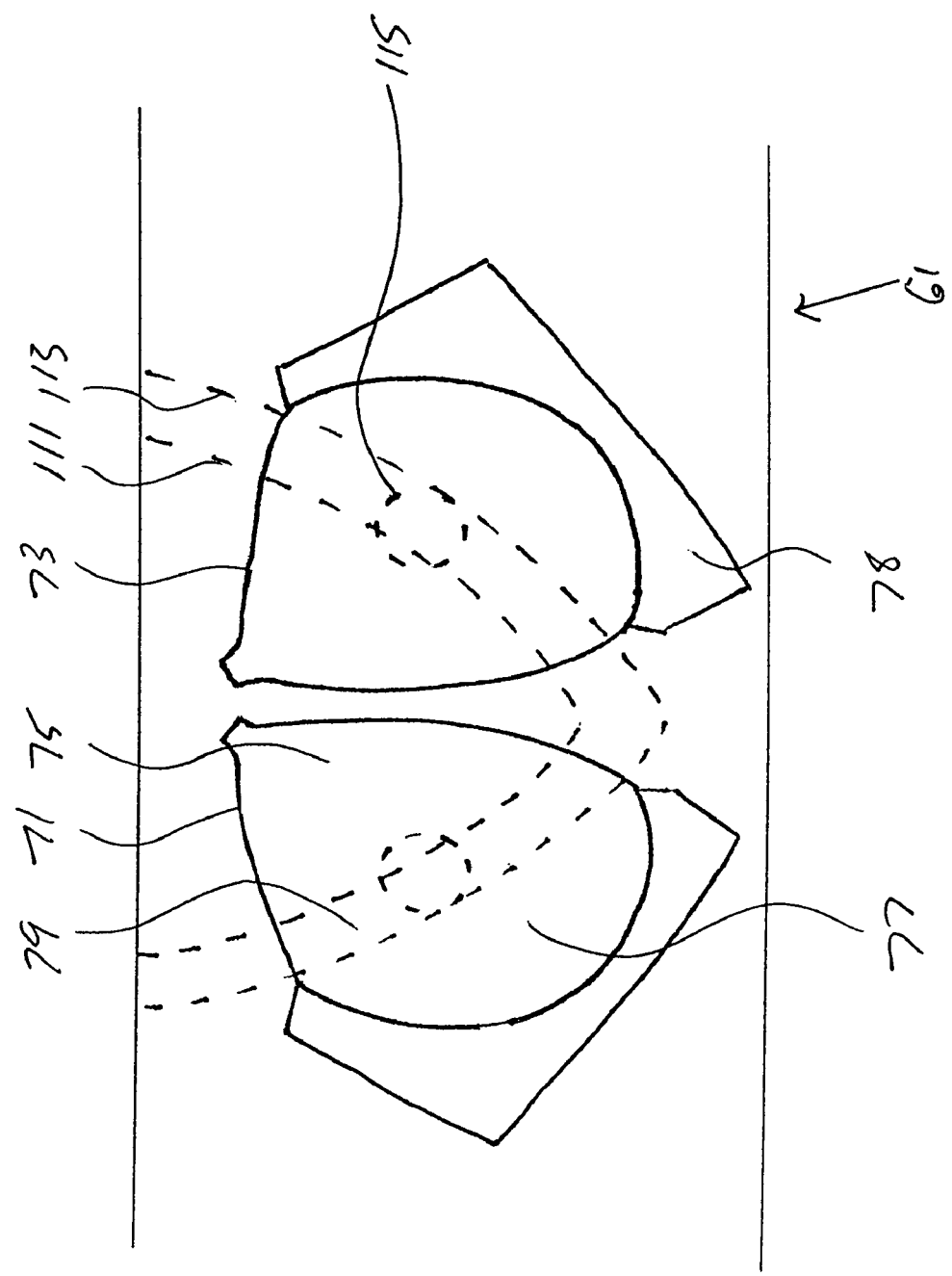
FIG. 13 is a side view of the molded pre-form assembly with the locations of the V-shaped recess and interface of the shaved rigid foam and elevated areas of the shaved stretchable foam designated by dashed lines.

A molding having male and female members compresses the assembly 61 for approximately 140 seconds at approximately a temperature of 190° to 210° Celsius, forming cup shapes 71 and 73 in the assembly 61 having a top thin area 75 corresponding to the region of the V-shaped recess 17 of the foam 15 (shown above a first dashed line 111), a bottom thick area 77 corresponding to the thicker area 19 of the shaved foam 15 (shown below a second dashed line 113), and a middle area 79 having graduated thickness corresponding to the graduated thickness interface area 16 of the foam 15 (shown between dashed lines 111 and 113), as shown in the diagram in FIG. 13. Furthermore, a pair of dashed circles 115 designate a region of the final pad corresponding to the region where the elevated areas 27 of the foam 25 overlap the graduated area 16 of the foam 15. The mold also presses and forms an area 78 below the cup shapes.

Figure 14:
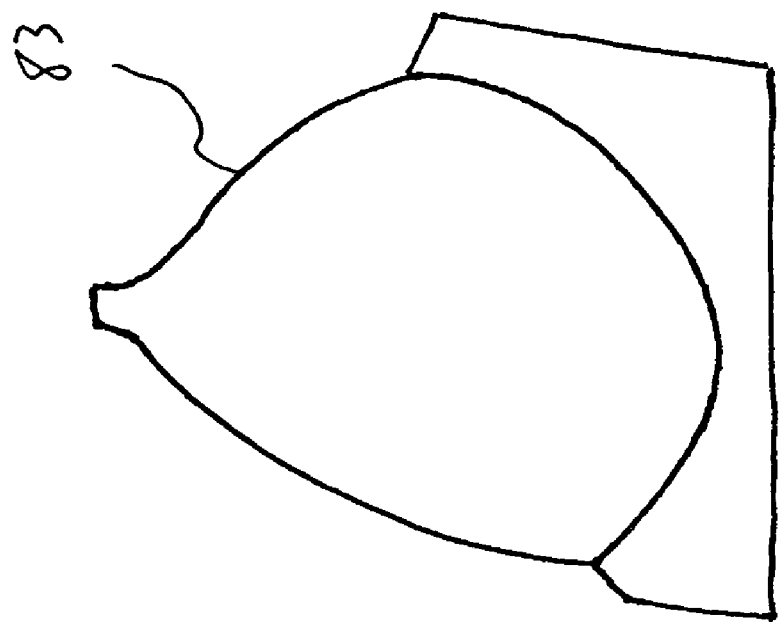
FIG. 14 is a top view of the final pads after the molded pre-form assembly is trimmed.
Figure 14:
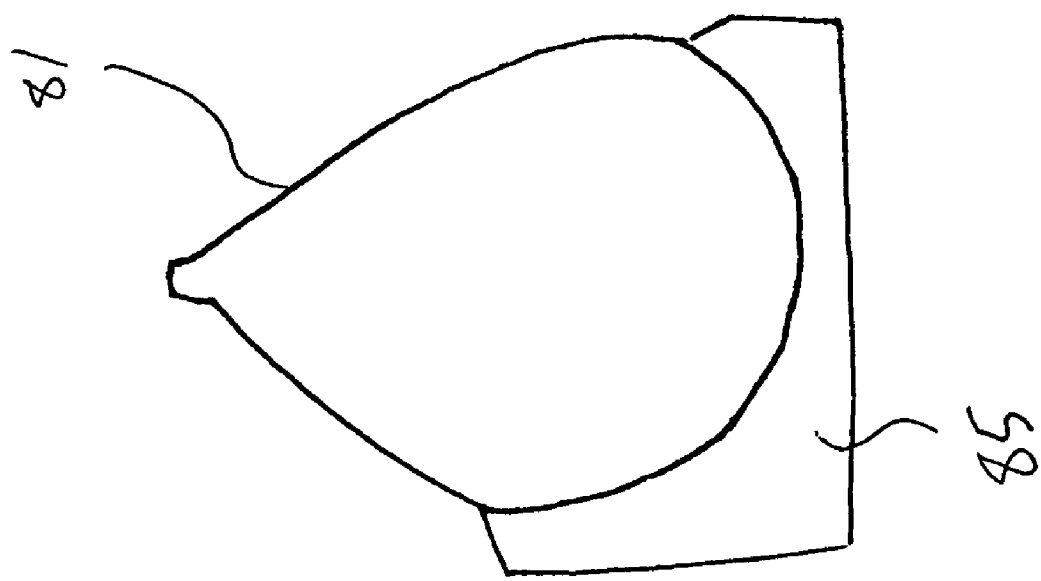

In the last step, final pads 81 and 83 are trimmed in the shape of cups shown in FIG. 14. Each pad has fabric attached on the front corresponding to the fabric 13 that was earlier laminated to the foam sheet 11 or shaved foam sheet 15. Each pad also has fabric attached to the rear of the pad corresponding to the fabric 23 that was earlier laminated to the foam sheet 21 or shaved foam sheet 25. Flanges 85 extend from the bottom portion of the pads and correspond to the area 78 pressed by the mold above.

Figure 15:
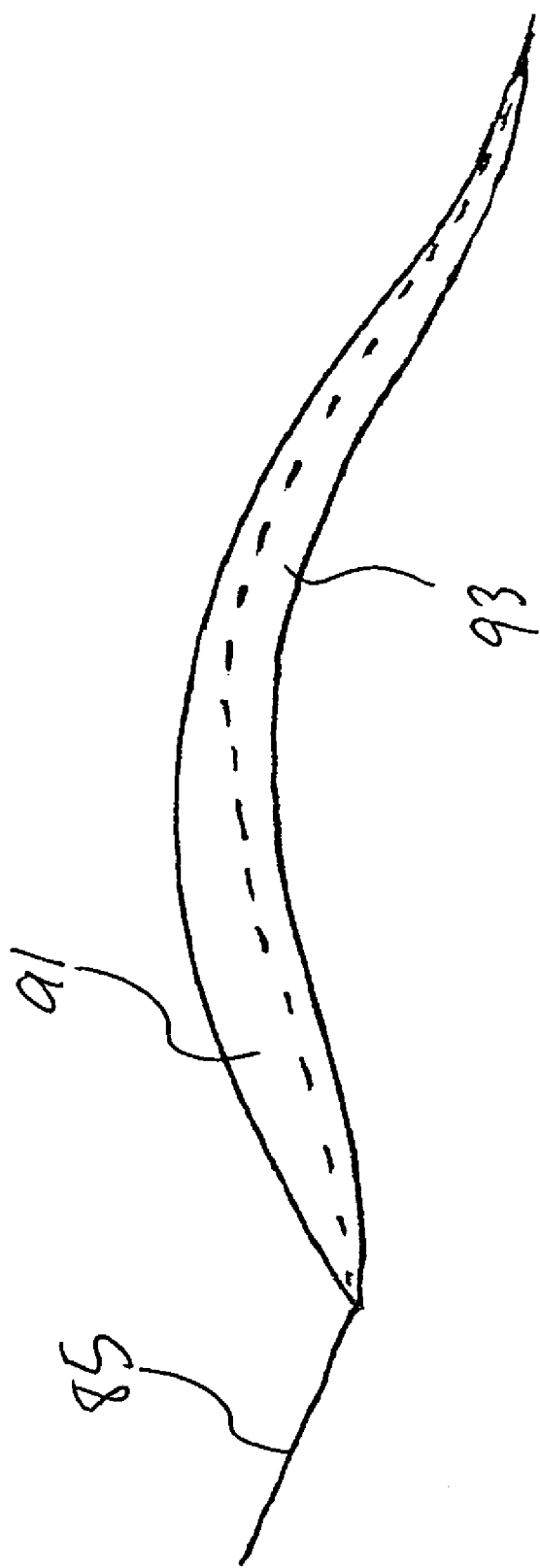
FIG. 15 is cross-section of the pad showing the layers of rigid and soft foam.

An approximate cross-section of a final pad is shown in FIG. 15. A dashed line separates the rigid foam section 91 from the stretchable foam section 93. The pad is thicker at the bottom area corresponding to the location of the thicker area 19 of shaved foam 15. More thick rigid foam is provided in this area for providing hidden support. The pads are thinnest at the top area of the pad corresponding to the region of the V-shaped recess 17 of the foam 15. More stretchable foam and less rigid foam is provided in this area for providing comfort and universal fit.

Also, thick areas (not shown) are provided in the center of the pads corresponding to the region where the elevated areas 27 of the foam 25 overlap the graduated area 16 of the foam 15.

While a specific embodiment of the invention has been shown and described in detail to illustrate the application of the principles of the invention, it will be understood that the invention may be embodied otherwise without departing from such principles.

What is claimed is:

1. A blank for making a pair of pads for a breast covering garment, comprising:
   a first assembly of a fabric laminated to a rigid thermoplastic foam, the rigid thermoplastic foam having a V-shaped recess extending to an upper edge of the first assembly and bounded by a sloped interface and a lower thicker material area;
   a second assembly of a fabric laminated to a stretchable thermoplastic foam, the stretchable thermoplastic foam having a pair of spaced apart elevated areas bounded by a thinner material area;
   the first and second assemblies being connected to each other to form a pre-form assembly, with the foams facing each other and the elevated areas being substantially located along the sloped interface;
   the pre-form assembly being molder into a selected shape to form the blank for containing the pair of pads, the pair of pads being cuttable from the blank.

2. The blank according to claim 1, further comprising a flange extending from a bottom of the pre-form.

3. The blank according to claim 1, wherein the rigid thermoplastic foam has a density in the range of 45 to 55 kg/m$^3$.

4. The blank according to claim 1, wherein the rigid thermoplastic foam has a hardness in the range of 43 to 57 N.

5. The blank according to claim 1, wherein the stretchable thermoplastic foam has a density in the range of 39 to 47 kg/m$^3$.

6. The blank according to claim 1, wherein the stretchable thermoplastic foam has a hardness in the range of 80 to 95 N.

7. A pair of pads for a breast covering garment, comprising:
   a first assembly of a fabric laminated to a rigid thermoplastic foam, the rigid thermoplastic foam having a V-shaped recess extending to an upper edge of the first assembly and bounded by a sloped interface and a lower thicker material area;
   a second assembly of a fabric laminated to a stretchable thermoplastic foam, the stretchable thermoplastic foam having a pair of spaced apart elevated areas bounded by a thinner material area;
   the first and second assemblies being connected to each other to form a pre-form assembly, with the foams facing each other and the elevated areas being substantially located along the sloped interface;
   the pre-form assembly being molder into a selected shape to form a blank for containing the pair of pads, the pair of pads being cuttable from the blank.

8. The pair of pads according to claim 7, further comprising a flange extending from a bottom of the pre-form.

9. The pair of pads according to claim 7, wherein the rigid thermoplastic foam has a density in the range of 45 to 55 kg/m$^3$.

10. The pair of pads according to claim 7, wherein the rigid thermoplastic foam has a hardness in the range of 43 to 57 N.

11. The pair of pads according to claim 7, wherein the stretchable thermoplastic foam has a density in the range of 39 to 47 kg/m$^3$.

12. The pair of pads according to claim 7, wherein the stretchable thermoplastic foam has a hardness in the range of 80 to 95 N.

* * * * *